US012301616B2

(12) United States Patent
Makhlevich et al.

(10) Patent No.: US 12,301,616 B2
(45) Date of Patent: May 13, 2025

(54) DETECTING MALICIOUS OBFUSCATION IN A SQL STATEMENT BASED ON AN EFFECT AND/OR PROCESSED VERSION THEREOF

(71) Applicant: Microsoft Technology Licensing, LLC, Redmond, WA (US)

(72) Inventors: Michael Makhlevich, Haifa (IL); Andrey Karpovsky, Kiryat Motzkin (IL); Fady Naser El Deen, Daliyat El Carmel (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 17/572,460

(22) Filed: Jan. 10, 2022

(65) Prior Publication Data

US 2023/0224323 A1      Jul. 13, 2023

(51) Int. Cl.
*H04L 9/40*      (2022.01)
*G06F 40/205*      (2020.01)

(52) U.S. Cl.
CPC ........ *H04L 63/1466* (2013.01); *G06F 40/205* (2020.01)

(58) Field of Classification Search
CPC ... H04L 63/1466; G06F 40/205; G06F 21/51; G06F 21/563
USPC .......................................................... 726/23
See application file for complete search history.

(56) References Cited

U.S. PATENT DOCUMENTS

| 8,010,522 B2 * | 8/2011 | Dewey | G06F 21/562 |
| | | | 707/754 |
| 8,225,402 B1 | 7/2012 | Averbuch et al. | |
| 11,354,306 B2 | 6/2022 | Wilding | |
| 11,824,894 B2 | 11/2023 | Simioni | |
| 2007/0192474 A1 * | 8/2007 | Decasper | H04L 67/306 |
| | | | 709/223 |
| 2009/0119777 A1 | 5/2009 | Jeon | |

(Continued)

FOREIGN PATENT DOCUMENTS

| CN | 110427754 A | 11/2019 | |
| WO | WO-2014152079 A1 * | 9/2014 | ............. G06F 21/10 |

OTHER PUBLICATIONS

"International Search Report and Written Opinion Issued in PCT Application No. PCT/US22/052487", Mailed Date: Jun. 20, 2023, 15 Pages.

(Continued)

*Primary Examiner* — Clayton R Williams
(74) *Attorney, Agent, or Firm* — Wade IP Law PLLC

(57) ABSTRACT

Techniques are described herein that are capable of detecting malicious obfuscation in a SQL statement based at least in part on an effect and/or processed version of the SQL statement. In a first example, a raw version of a SQL statement is compared to a processed version of the SQL statement. A determination is made that a command in the processed version is not included in the raw version. The raw version is detected to be malicious based at least in part on the determination. In a second example, a SQL statement is bound to an event that results from execution of the SQL statement. Textual content of the SQL statement and an effect of the event are compared. The SQL statement is detected to be malicious based at least in part on the effect of the event not being indicated by the textual content.

20 Claims, 9 Drawing Sheets

(56) References Cited

U.S. PATENT DOCUMENTS

| | | |
|---|---|---|
| 2009/0150374 A1 | 6/2009 | Dewey |
| 2015/0156209 A1* | 6/2015 | Heart ................. H04L 63/1466 |
| | | 726/23 |
| 2017/0220798 A1 | 8/2017 | Madou et al. |
| 2018/0278647 A1* | 9/2018 | Gabaev ............... H04L 63/1425 |
| 2019/0297056 A1* | 9/2019 | Chiang ............... H04L 63/1466 |
| 2020/0097587 A1* | 3/2020 | Klein .................. G06F 16/2462 |
| 2020/0404007 A1 | 12/2020 | Singh et al. |
| 2021/0203676 A1* | 7/2021 | Pendse ................ H04L 63/1416 |
| 2021/0357409 A1 | 11/2021 | Rodriguez |
| 2022/0004630 A1 | 1/2022 | Almukaynizi |
| 2022/0166795 A1 | 5/2022 | Simioni |

OTHER PUBLICATIONS

Buehrer, et al., "Using parse tree validation to prevent SQL injection attacks", In Proceedings of the 5th international workshop on Software engineering and middleware, Sep. 5, 2005, pp. 106-113.

"International Search Report and Written Opinion Issued in PCT Application No. PCT/US22/052188", Mailed Date: Apr. 5, 2023, 11 Pages.

"Invitation to Pay Additional Fees Issued in PCT Application No. PCT/US22/052487", Mailed Date: Apr. 28, 2023, 8 Pages.

"Application as Filed in U.S. Appl. No. 17/565,155", filed Dec. 29, 2021, 36 Pages.

Non-Final Office Action mailed on Dec. 29, 2023, in U.S. Appl. No. 17/565,155, 14 pages.

Notice of Allowance mailed on Jun. 24, 2024, in U.S. Appl. No. 17/565,155, 11 pages.

* cited by examiner

DETECTING MALICIOUS OBFUSCATION IN A SQL STATEMENT BASED ON AN EFFECT AND/OR PROCESSED VERSION THEREOF

BACKGROUND

Intrusion detection systems often monitor networks or systems to detect malicious activity. Entities that initiate the malicious activity are referred to as attackers. Entities that defend against the malicious activity are referred to as defenders. Attackers and defenders are constantly competing in the field of cyber defense. While defenders invest substantial time using intrusion detection systems to detect malicious activity, attackers dedicate substantial time to keep their malicious activities hidden. However, attackers have a gain that they aspire to achieve with each malicious action, which often pushes them to use commands that are known to have a high impact on networks or systems. Such commands typically are monitored and audited by intrusion detection systems.

To evade such monitoring, to impede regular expression-based detection by machine logic, and to prevent discovery of malicious commands by human analysts, attackers commonly use obfuscation techniques to hide the content of the malicious commands. The obfuscation can be multi-layered and can use multiple techniques. Conventional techniques for identifying obfuscation typically involve flagging commands that include a relatively high density of string and bits manipulation. However, these conventional techniques have their limitations. For instance, without understanding the content of a command, it may be difficult to determine whether an activity is malicious. Even if the activity is known to be malicious, without understanding the content of the command, usability of the conventional techniques and a user experience of a user regarding categorizing and describing the attack may be relatively low.

Another technique for identifying obfuscation in a command is to fully (e.g., iteratively) parse the command. However, parsing usually has a relatively high computed overhead and may result in relatively high costs. Also, parsing may require support for multiple scripting and querying languages. Accordingly, parsing may be difficult to scale from the perspective of a defender.

SUMMARY

Various approaches are described herein for, among other things, detecting malicious obfuscation in a structured query language (SQL) statement based on (e.g., based at least in part on) an effect and/or processed version of the SQL statement. A SQL statement is a statement generated using SQL. SQL is a domain-specific language used in programming. For instance, SQL may be used to manage data stored in a relational database management system (RDBMS) and/or to process data streams in real-time in a relational data stream management system (RDSMS). SQL is capable of handling structured data, including relations among entities and variables. Example types of a SQL statement include but are not limited to a data query language (DQL) statement, a data definition language (DDL) statement, a data control language (DCL) statement, and a data manipulation language (DML) statement. A DQL statement is a SQL statement that is configured to perform a query on data in a schema object. For instance, the DQL statement may obtain a schema relation based on a query that is passed to the DQL statement. A DDL statement is a SQL statement that is configured to define a data structure (e.g., a database schema). A DCL statement is a SQL statement that controls access to data that is stored in a database. A DML statement is a SQL statement that is configured to add (a.k.a. insert), delete, and/or modify (a.k.a. update) data in a database.

Examples of obfuscation include but are not limited to string concatenation, type casting, base changing, case changing, script changing, and encryption. In string concatenation, multiple parts of a string, which defines at least a portion of a command, are concatenated using one or more concatenation operators to form the string. In type casting, a type of at least a portion of a command is changed from a first data type to a second data type that is different from the first data type. Examples of a data type include but are not limited to integer number, floating-point number, character, string, Boolean, and ASCII. In base changing, the base of a number is changed. For instance, a number may be changed from base-32 to base-64 or from hexadecimal (i.e., base-16) to binary (i.e., base-2). It will be recognized that base changing may involve changing a number from any suitable base to any suitable different base. In case changing, the case of one or more letters in a command is changed. For example, the case of one or more letters may be changed from lower case to upper case, and/or the case of one or more other letters may be changed from upper case to lower case. In accordance with this example, the capitalization of any one or more letters may be randomized. In script changing, one or more characters are changed from a first script to a second script that is different from the first script. Examples of a script include but are not limited to Cyrillic, English, Latin, and Persian. In encryption, plaintext is converted into a cypher. For instance, data of an arbitrary size may be encrypted using a hash function to provide a hash value of a fixed size.

If a processed version of a SQL statement is known, a raw (e.g., unprocessed) version of the SQL statement may be compared to the processed version to determine whether the processed version includes any commands that are not included in the raw version. The processed version including command(s) that are not included in the raw version weighs in favor of the SQL statement being deemed malicious (e.g., may indicate that the SQL statement is malicious).

Regardless of whether a processed version of a SQL statement is known, if the SQL statement (e.g., a raw version of the SQL statement) is executed, the execution results in an event. An effect of the event may be compared to textual content of the SQL statement to determine whether the effect of the event is indicated by the textual content. The effect of the event not being indicated by the textual content of the SQL statement weighs in favor of the SQL statement being deemed malicious (e.g., may indicate that the SQL statement is malicious).

In a first example approach, a raw version of a SQL statement is compared to a processed version of the SQL statement that results from parsing of the raw version of the SQL statement. The raw version of the SQL statement and the processed version of the SQL statement are configured to produce a common result. A determination is made that a command that is included in the processed version of the SQL statement is not included in the raw version of the SQL statement. The raw version of the SQL statement is detected to be malicious based at least in part on the command that is included in the processed version of the SQL statement not being included in the raw version of the SQL statement.

In a second example approach, a SQL statement is bound to an event that results from execution of the SQL statement. Textual content of the SQL statement and an effect of the event are compared. The SQL statement is detected to be malicious based at least in part on the effect of the event not being indicated by the textual content of the SQL statement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
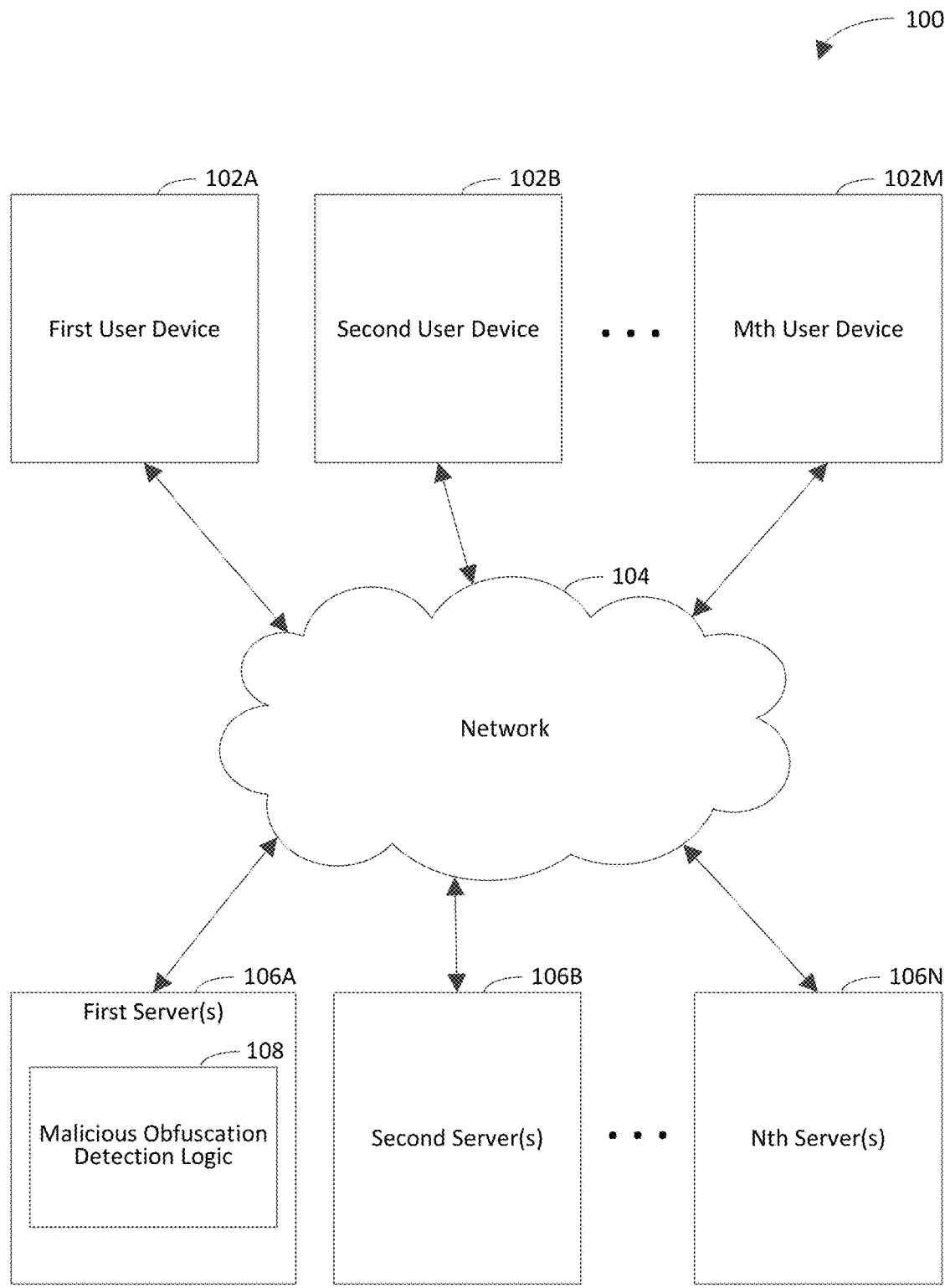
FIG. 1 is a block diagram of an example malicious obfuscation detection system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of detecting malicious obfuscation in a structured query language (SQL) statement based on (e.g., based at least in part on) an effect and/or processed version of the SQL statement. A SQL statement is a statement generated using SQL. SQL is a domain-specific language used in programming. For instance, SQL may be used to manage data stored in a relational database management system (RDBMS) and/or to process data streams in real-time in a relational data stream management system (RDSMS). SQL is capable of handling structured data, including relations among entities and variables. Example types of a SQL statement include but are not limited to a data query language (DQL) statement, a data definition language (DDL) statement, a data control language (DCL) statement, and a data manipulation language (DML) statement. A DQL statement is a SQL statement that is configured to perform a query on data in a schema object. For instance, the DQL statement may obtain a schema relation based on a query that is passed to the DQL statement. A DDL statement is a SQL statement that is configured to define a data structure (e.g., a database schema). A DCL statement is a SQL statement that controls access to data that is stored in a database. A DML statement is a SQL statement that is configured to add (a.k.a. insert), delete, and/or modify (a.k.a. update) data in a database.

Examples of obfuscation include but are not limited to string concatenation, type casting, base changing, case changing, script changing, and encryption. In string concatenation, multiple parts of a string, which defines at least a portion of a command, are concatenated using one or more concatenation operators to form the string. In type casting, a type of at least a portion of a command is changed from a first data type to a second data type that is different from the first data type. Examples of a data type include but are not limited to integer number, floating-point number, character, string, Boolean, and ASCII. In base changing, the base of a number is changed. For instance, a number may be changed from base-32 to base-64 or from hexadecimal (i.e., base-16) to binary (i.e., base-2). It will be recognized that base changing may involve changing a number from any suitable base to any suitable different base. In case changing, the case of one or more letters in a command is changed. For example, the case of one or more letters may be changed from lower case to upper case, and/or the case of one or more other letters may be changed from upper case to lower case. In accordance with this example, the capitalization of any one or more letters may be randomized. In script changing, one or more characters are changed from a first script to a second script that is different from the first script. Examples of a script include but are not limited to Cyrillic, English, Latin, and Persian. In encryption, plaintext is converted into a cypher. For instance, data of an arbitrary size may be encrypted using a hash function to provide a hash value of a fixed size.

If a processed version of a SQL statement is known, a raw (e.g., unprocessed) version of the SQL statement may be compared to the processed version to determine whether the processed version includes any commands that are not included in the raw version. The processed version including command(s) that are not included in the raw version weighs in favor of the SQL statement being deemed malicious (e.g., may indicate that the SQL statement is malicious).

Regardless of whether a processed version of a SQL statement is known, if the SQL statement (e.g., a raw version of the SQL statement) is executed, the execution results in an event. An effect of the event may be compared to textual content of the SQL statement to determine whether the effect of the event is indicated by the textual content. The effect of the event not being indicated by the textual content of the SQL statement weighs in favor of the SQL statement being deemed malicious (e.g., may indicate that the SQL statement is malicious).

Example techniques described herein have a variety of benefits as compared to conventional techniques for detecting malicious obfuscation in a SQL statement. For instance, the example techniques may be more efficient, reliable, and/or effective than conventional techniques for detecting such malicious obfuscation, for example, by increasing accuracy and/or precision of the detection. Accordingly, the example techniques may have a greater usability and/or increase a user experience of a user regarding categorization and describing a malicious attack. The example techniques are capable of detecting malicious obfuscation in a SQL statement regardless how many layers of obfuscation are included in the SQL statement. The malicious obfuscation can be detected even if the obfuscation techniques are not known. The example techniques may scale between scripting and querying engines. If an engine is capable of parsing through obfuscation in a SQL statement, the example techniques may be capable of identifying the obfuscation and determining whether the obfuscation is malicious. Detection of malicious obfuscation in a SQL statement may be performed in real-time, for example, because parsing of the SQL statement is not needed. The detection may be stateless. The example techniques may be machine-learning-based, rules-based, and/or statistics-based.

The example techniques may reduce an amount of time and/or resources (e.g., processor cycles, memory, network bandwidth) that is consumed to detect malicious obfuscation in a SQL statement. For instance, by detecting the malicious obfuscation based on a processed version of the SQL statement and/or based on an effect of an event that results from execution of the SQL statement, the SQL statement need not necessarily be parsed (e.g., re-parsed). By detecting the malicious obfuscation without parsing (e.g., re-parsing) the SQL statement, a computing system that is configured to detect the malicious obfuscation may conserve the time and resources that would have been consumed by parsing the SQL statement. By reducing the amount of time and/or resources that is consumed, the example techniques may increase an efficiency of the computing system that is configured to detect the malicious obfuscation. It should be noted that the computing system and a relational database management system (RDBMS) that parses the SQL statement may share the same compute resources. For instance, the computing system and the RDBMS may be applications that are running on the same compute resources. By implementing one or more of the example techniques described herein, the computing system may avoid re-parsing the SQL statement and thereby avoid taking compute resources from the RDBMS.

Security of a network and/or a computing system that is targeted by a malicious SQL statement may be increased by detecting that the SQL statement is malicious in accordance with one or more of the example techniques described herein. For instance, as a result of detecting that the SQL statement is malicious, the example techniques may perform remedial operations, including but not limited to providing notice of the malicious SQL statement, preventing execution of the malicious SQL statement, and/or mitigating damage that occurs as a result of the malicious SQL statement being executed.

The example techniques may be incorporated into an operating system (e.g., an anti-malware component thereof), though the example embodiments are not limited in this respect. Examples of an operating system include but are not limited to Berkeley Software Distribution™ (BSD), developed and distributed by the Computer Systems Research Group (CSRG) of the University of California, Berkeley, or descendants thereof; Linux developed and distributed under the GNU Project; Mac OS® developed and distributed by Apple Inc.; Microsoft Windows® developed and distributed by Microsoft Corporation; and UNIX™ developed and distributed by AT&T.

FIG. 1 is a block diagram of an example malicious obfuscation detection system 100 in accordance with an embodiment. Generally speaking, the malicious obfuscation detection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the malicious obfuscation detection system 100 detects malicious obfuscation in a SQL statement based on a processed version of the SQL statement and/or an effect of an event that results from executing the SQL statement. Detail regarding techniques for detecting malicious obfuscation in a SQL statement is provided in the following discussion.

As shown in FIG. 1, the malicious obfuscation detection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Any one or more of the computer programs may be a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon.com Web Services® developed and distributed by Amazon.com, Inc., Salesforce® developed and distributed by Salesforce.com, Inc., and Rackspace® developed and distributed by Rackspace US, Inc. In accordance with some example embodiments, the servers 106A-106N are configured to host respective Web sites, so that the Web sites are accessible to users of the malicious obfuscation detection system 100.

The first server(s) 106A are shown to include malicious obfuscation detection logic 108 for illustrative purposes. The malicious obfuscation detection logic 108 is configured to detect malicious obfuscation in a SQL statement based on a processed version of the SQL statement and/or an effect of an event that results from executing the SQL statement. In a first example implementation, the malicious obfuscation detection logic 108 compares a raw version of a SQL statement to a processed version of the SQL statement that results from parsing of the raw version of the SQL statement. The raw version of the SQL statement and the processed version of the SQL statement are configured to produce a common result. The malicious obfuscation detection logic 108 determines that a command that is included in the processed version of the SQL statement is not included in the raw version of the SQL statement. The malicious obfuscation detection logic 108 detects that the raw version of the SQL statement is malicious based at least in part on the command that is included in the processed version of the SQL statement not being included in the raw version of the SQL statement.

In a second example implementation, the malicious obfuscation detection logic 108 binds a SQL statement to an event that results from execution of the SQL statement. The malicious obfuscation detection logic 108 compares textual content of the SQL statement and an effect of the event. The malicious obfuscation detection logic 108 detects that the SQL statement is malicious based at least in part on the effect of the event not being indicated by the textual content of the SQL statement.

The malicious obfuscation detection logic 108 may use machine learning to perform at least some of its operations. For instance, the malicious obfuscation detection logic 108 may use the machine learning to develop and refine a malicious obfuscation profile that characterizes obfuscation in SQL statements. The malicious obfuscation detection logic 108 may use the machine learning to analyze a SQL statement, event(s) that result from execution of the SQL statement, effect(s) of the event(s), and/or a processed version of the SQL statement to determine whether the SQL statement includes malicious obfuscation. For instance, malicious obfuscation detection logic 108 may make the determination based on a disparity between unprocessed and processed versions of the SQL statement and/or a disparity between textual content of the SQL statement and effect(s) of event(s) that result from execution of the SQL statement. It should be noted that the event(s) that result from execution of the SQL statement and the effect(s) of the event(s) may be detected by sensors on the network, operating system(s), or other points in the system.

The malicious obfuscation detection logic 108 may use a neural network to perform the machine learning to determine malicious obfuscation in a SQL statement. The malicious obfuscation detection logic 108 may use the malicious obfuscation profile that characterizes that characterizes obfuscation in SQL statements to determine the malicious obfuscation and/or may incorporate the determined malicious obfuscation into the malicious obfuscation profile. Examples of a neural network include but are not limited to a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the malicious obfuscation detection logic 108 employs a feed forward neural network to train a machine learning model that is used to determine ML-based confidences. Such ML-based confidences may be used to determine likelihoods that events will occur.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In one example, the LSTM neural network may be capable of storing information, such as historical SQL statements, events that result from those SQL statements, effects of those events, and processed versions of the SQL statements over time. For instance, the LSTM neural network may generate a malicious SQL statement model by utilizing such information. In another example, the LSTM neural network may be capable of remembering relationships between features, such as SQL statements, events that result from execution of the SQL statements, effects of those events, probabilities that events result from SQL statements, probabilities that effects are attributable to the events, processed versions of the SQL statements, and ML-based confidences that are derived therefrom.

The malicious obfuscation detection logic 108 may include training logic and inference logic. The training logic is configured to train a machine learning algorithm that the inference logic uses to determine (e.g., infer) the ML-based confidences. For instance, the training logic may provide sample SQL statements, sample events that result therefrom, sample effects of the events, sample probabilities that events result from SQL statements, sample probabilities that effects are attributable to the events, sample processed versions of the SQL statements, and sample confidences as inputs to the algorithm to train the algorithm. The sample data may be labeled. The machine learning algorithm may be configured to derive relationships between the features (e.g., SQL statements, events that result therefrom, effects of the events, probabilities that events result from SQL statements, probabilities that effects are attributable to the events, and processed versions of SQL statements) and the resulting ML-based confidences. The inference logic is configured to utilize the machine learning algorithm, which is trained by the training logic, to determine the ML-based confidence when the features are provided as inputs to the algorithm.

The malicious obfuscation detection logic 108 may be implemented in various ways to detect malicious obfuscation in a SQL statement based on a processed version of the SQL statement and/or an effect of an event that results from execution of the SQL statement, including being implemented in hardware, software, firmware, or any combination thereof. For example, the malicious obfuscation detection logic 108 may be implemented as computer program code configured to be executed in one or more processors. In another example, at least a portion of the malicious obfuscation detection logic 108 may be implemented as hardware logic/electrical circuitry. For instance, at least a portion of the malicious obfuscation detection logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The malicious obfuscation detection logic 108 may be partially or entirely incorporated in a cloud computing service, though the example embodiments are not limited in this respect.

The malicious obfuscation detection logic 108 is shown to be incorporated in the first server(s) 106A for illustrative purposes and is not intended to be limiting. It will be recognized that the malicious obfuscation detection logic 108 (or any portion(s) thereof) may be incorporated in any one or more of the user devices 102A-102M. For example, client-side aspects of the malicious obfuscation detection logic 108 may be incorporated in one or more of the user devices 102A-102M, and server-side aspects of malicious obfuscation detection logic 108 may be incorporated in the first server(s) 106A. In another example, the malicious obfuscation detection logic 108 may be distributed among the user devices 102A-102M. In yet another example, the malicious obfuscation detection logic 108 may be incorporated in a single one of the user devices 102A-102M. In another example, the malicious obfuscation detection logic 108 may be distributed among the server(s) 106A-106N. In still another example, the malicious obfuscation detection logic 108 may be incorporated in a single one of the servers 106A-106N.

Figure 2:
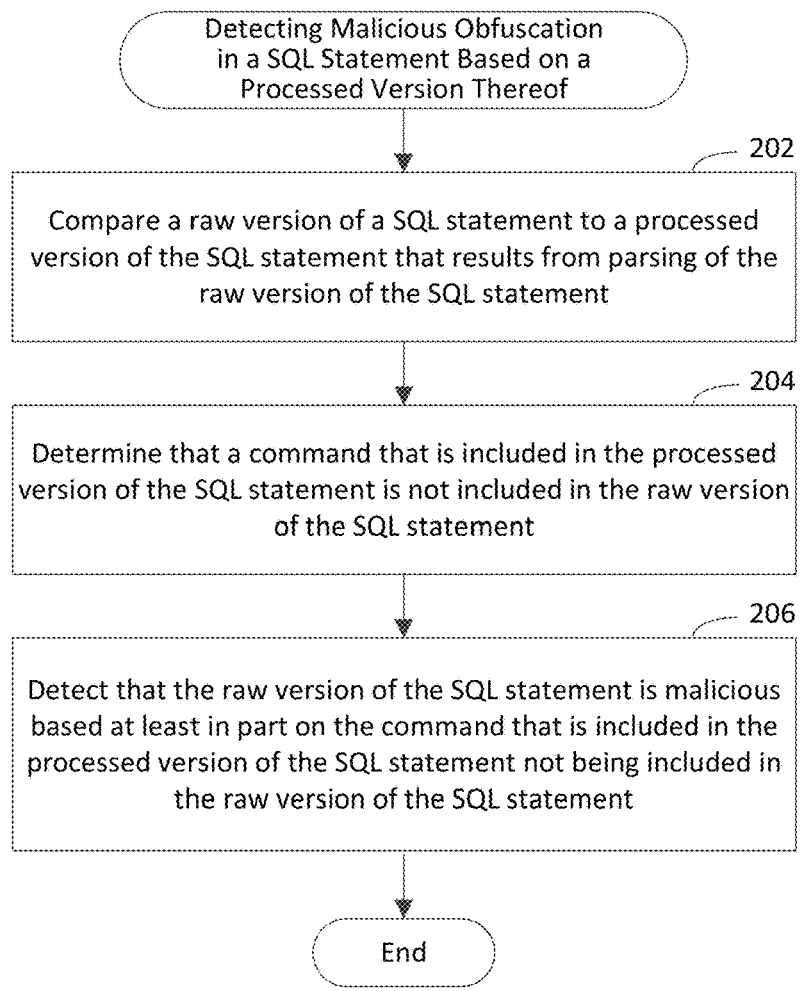
FIG. 2 depicts a flowchart of an example method for detecting malicious obfuscation in a SQL statement based on a processed version thereof in accordance with an embodiment.
Figure 3:
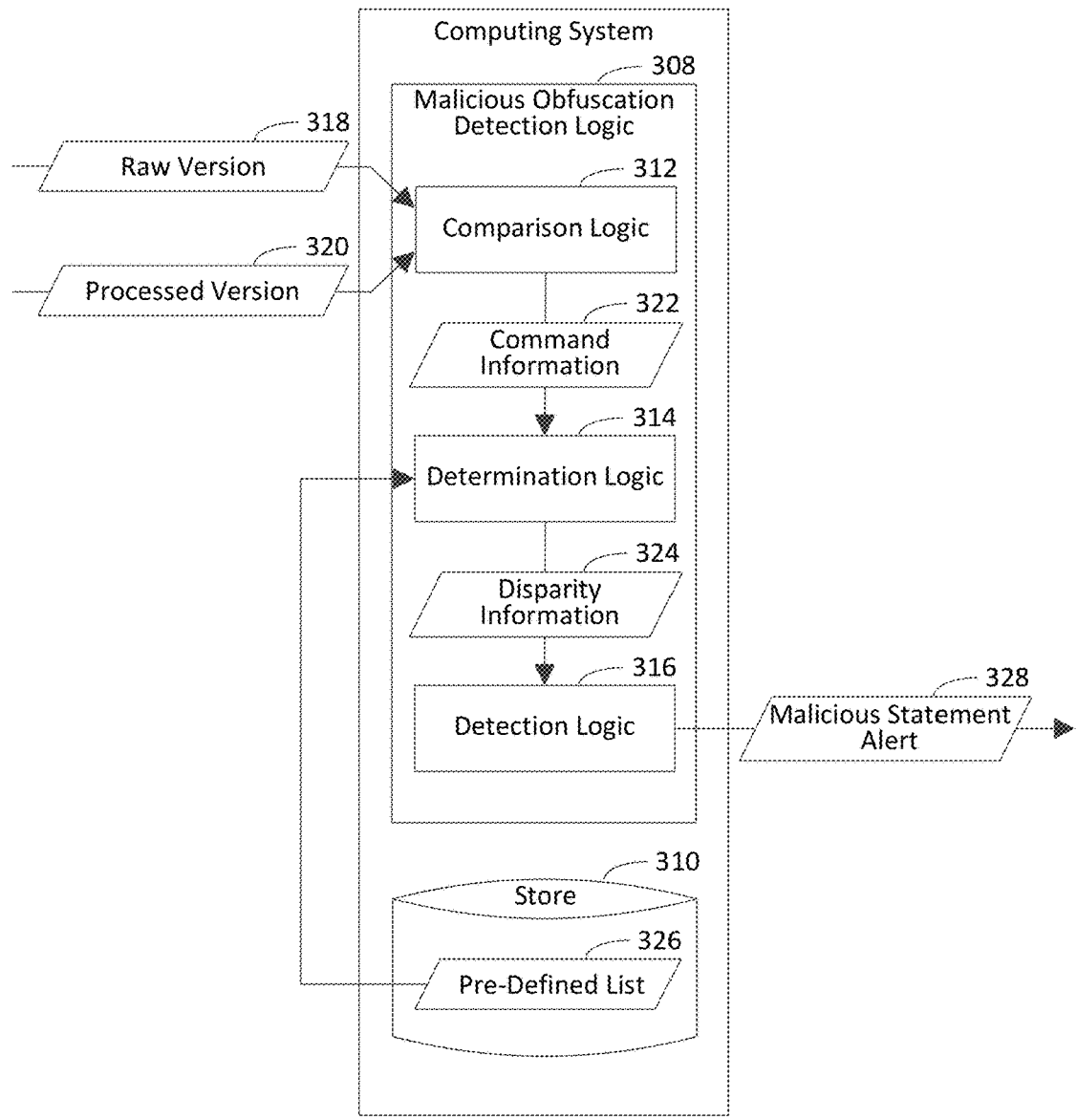
FIG. 3 is a block diagram of an example computing system in accordance with an embodiment.

FIG. 2 depicts a flowchart 200 of an example method for detecting malicious obfuscation in a SQL statement based on a processed version thereof in accordance with an embodiment. Flowchart 200 may be performed by the first server(s) 106A shown in FIG. 1, for example. For illustrative purposes, flowchart 200 is described with respect to computing system 300 shown in FIG. 3, which is an example implementation of the first server(s) 106A. As shown in FIG. 3, the computing system 300 includes malicious obfuscation detection logic 308 and a store 310. The malicious obfuscation detection logic 308 includes comparison logic 312, determination logic 314, and detection logic 316. The store 310 may be any suitable type of store. One type of store is a database. For instance, the store 310 may be a relational database, an entity-relationship database, an object database, an object relational database, an extensible markup language (XML) database, etc. The store 310 is shown to store a pre-defined list 326 for non-limiting illustrative purposes. Further structural and operational embodiments will be apparent to persons skilled in the relevant art(s) based on the discussion regarding flowchart 200.

As shown in FIG. 2, the method of flowchart 200 begins at step 202. In step 202, a raw version of a SQL statement is compared to a processed version of the SQL statement that results from parsing of the raw version of the SQL statement. The raw version of the SQL statement and the processed version of the SQL statement are configured to produce a common result. For example, a series of bits that defines the SQL statement may be common among the raw version of the SQL statement and the processed version of the SQL statement. In accordance with this example, the series of bits may be interpreted in a first manner to define the raw version of the SQL statement, and the series of bits may be interpreted in a second manner, which is different from the first manner, to define the processed version of the SQL statement. For instance, parsing the raw version of the SQL statement may result in the processed version of the SQL statement being interpreted differently than the raw version of the SQL statement. For example, parsing the raw version of the SQL statement may remove obfuscation of one or more commands, such that those command(s) are indicated by the processed version of the SQL statement and not by the raw version of the SQL statement. In an example implementation, the comparison logic 312 compares a raw version 318 of a SQL statement to a processed version 320 of the SQL statement, which results from parsing of the raw version 318 of the SQL statement. In accordance with this implementation, the raw version 318 of the SQL statement and the processed version 320 of the SQL statement are configured to produce a common result. The comparison logic 312 may generate command information 322 to indicate first commands that are included in the raw version 318 of the SQL statement and second commands that are included in the processed version 320 of the SQL statement.

In an example embodiment, the raw version of the SQL statement formats a binary array that defines the SQL statement using a first format, and the processed version of the SQL statement formats the binary array using a second format that is different from the first format. For instance, the first formal may include more obfuscation than the second format. For example, the second format may include no obfuscation. In another example, each of the first and second formats may include multiple layers of obfuscation, and the first format may include more layers of obfuscation than the second format. In an aspect of this embodiment, the SQL statement may be written in accordance with the first format, and the SQL statement may be read in accordance with the second format. In this way, it can be seen that the underlying SQL statement may be the same for the raw and processed versions, though the raw version of the SQL statement represents a formatting that is used to write the SQL statement and the processed version of the SQL statement represents a formatting that is used to read the SQL statement.

The raw version of the SQL statement may include any suitable type of obfuscation. In an example embodiment, the raw version of the SQL statement utilizes string concatenation and/or type casting. In string concatenation, multiple parts of a string, which defines at least a portion of a command, are concatenated using one or more concatenation operators to form the string. In type casting, a type of at least a portion of a command is changed from a first data type to a second data type that is different from the first data type. Examples of a data type include but are not limited to integer number, floating-point number, character, string, Boolean, and ASCII.

At step 204, a determination is made that a command that is included in the processed version of the SQL statement is not included in the raw version of the SQL statement. In an example implementation, the determination logic 314 determines that a command that is included in the processed version 320 of the SQL statement is not included in the raw version 318 of the SQL statement. For instance, the determination logic 314 may compare the first commands and the second commands, as indicated by the command information 322, to determine that the command is included in the second commands and not in the first commands. It will be recognized that any commands that are included in the second commands and not in the first commands are included in the processed version 320 of the SQL statement and not in the raw version 318 of the SQL statement. Thus, by determining that the command is included in the second commands and not in the first commands, the determination logic 314 determines that the command is included in the processed version 320 of the SQL statement and not in the raw version 318 of the SQL statement. The determination logic 316 may generate disparity information 324, which indicates one or more disparities between the raw version 318 of the SQL statement and the processed version 320 of the SQL statement. For instance, the determination logic 314 generates the disparity information 324 to identify the command and to indicate that the command is included in the processed version 320 of the SQL statement and not in the raw version 318 of the SQL statement.

In an example embodiment, the command is configured to connect to a website hosted by a computer that is external to a computing system that performs step 204.

In another example embodiment, the command is configured to connect to a device having an IP address that is different from an IP address of a computing system that performs step 204.

In yet another example embodiment, the command is configured to change one or more configuration settings of a computer (e.g., a server or a user device). For instance, the computer may be a computing system that performs step 204. Examples of a configuration setting include but are not limited to a priority of a user and a security setting (e.g., close a firewall or alter an encryption technique). The configuration settings may be included in an operating system registry, though the example embodiments are not limited in this respect.

In still another example embodiment, the command is configured to communicate with an operating system that executes on a computer (e.g., a server or a user device). For instance, the command may invoke a command shell (e.g., xp_cmdshell). The xp_cmdshell command enables a computing system (e.g., a database server) to run a command shell script on an operating system. For instance, the xp_cmdshell command may open a command line into a computer that hosts the operating system The operating system may be hosted by the computing system that runs the command shell or by a different computing system.

At step 206, the raw version of the SQL statement is detected to be malicious based at least in part on the command that is included in the processed version of the SQL statement not being included in the raw version of the SQL statement. In an example implementation, the detection logic 316 detects that the raw version 318 of the SQL statement is malicious based at least in part on the command that is included in the processed version 320 of the SQL statement not being included in the raw version 318 of the SQL statement. For instance, the detection logic 316 may detect that the raw version 318 of the SQL statement is malicious based on the disparity information 324 identifying the command and indicating that the command is included in the processed version 320 of the SQL statement and not in the raw version 318 of the SQL statement. In an aspect of this implementation, the detection logic 316 may generate a malicious statement alert 328 to provide notification that the raw version 318 of the SQL statement is malicious. For instance, the malicious statement alert 328 may be an electronic mail (email) message, a text message, a short message service (SMS) message, or an audio message. In another aspect of this implementation, the detection logic 316 may prevent the SQL statement from executing.

In an example embodiment, detecting that the raw version of the SQL statement is malicious at step 206 is performed prior to execution of the SQL statement. For instance, detecting that the raw version of the SQL statement is malicious at step 206 may include preemptively detecting that the raw version of the SQL statement is malicious.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes determining whether the command that is included in the processed version of the SQL statement is included in a pre-defined list of commands that are known to have been used for malicious activity. For instance, each command may be included in the pre-defined list based on the respective command being used to perform a malicious activity and/or to produce a negative result having a scope that is greater than or equal to a scope threshold. The scope threshold may indicate a threshold number of user who are expected to be negatively affected by the command, a threshold amount of damage (e.g., down time of a system or loss of control of a system) that is expected to result from execution of the command, or a threshold likelihood that a negative result will occur as a result of executing the command. For example, the determination logic 314 may determine whether the command that is included in the processed version 320 of the SQL statement is included in the pre-defined list 326 of commands that are known to have been used for malicious activity. Examples of malicious activity include but are not limited to compromising (e.g., disrupting) performance of a system (e.g., computer system) or network (e.g., computer network); obtaining unauthorized access to information or a system; unauthorized disclosure of private information; interfering with (e.g., preventing) access of a user to information or a system; and/or attempting any of the foregoing. In accordance with this example, the determination logic 314 may retrieve the pre-defined list 326 from the store 310 and traverse the pre-defined list 326 to determine whether the pre-defined list 326 includes the command. In accordance with this embodiment, detecting that the raw version of the SQL statement is malicious at step 206 is further based at least in part on the command that is included in the processed version of the SQL statement being included in the pre-defined list of commands that are known to have been used for malicious activity. For instance, the determination logic 314 may detect that the raw version 318 of the SQL statement is malicious further based at least in part on the command that is included in the processed version 320 of the SQL statement being included in the pre-defined list 326 of commands that are known to have been used for malicious activity.

It will be recognized that the computing system 300 may not include one or more of the malicious obfuscation detection logic 308, the store 310, the comparison logic 312, the determination logic 314, and/or the detection logic 316. Furthermore, the computing system 300 may include components in addition to or in lieu of the malicious obfuscation detection logic 308, the store 310, the comparison logic 312, the determination logic 314, and/or the detection logic 316.

An example implementation will now be described in which a SQL statement is obfuscated with multiple layers of obfuscation. Assume for purposes of illustration that the original SQL statement (i.e., prior to obfuscation) is "xp_cmdshell 'c:\temp\Script.bat'". A first layer of obfuscation may be applied to the original SQL statement to provide the following first obfuscated version of the SQL statement: "DECLARE @cmd as varchar(3000);SET @cmd= 'x'+'p'+'_'+'c'+'m'+'d'+'s'+'h'+'e'+'l'+'l'+ 'c:\temp\Script.bat';exec(@cmd);". The first obfuscated version of the SQL statement results from applying string concatenation to a portion of the original SQL statement, writing the resulting command into a variable, and configuring the first obfuscated version to execute the command. A second layer of obfuscation may be applied to the first obfuscated version of the SQL statement by casting the concatenated characters (x, p, _, c, m, d, s, h, e, l, l) from the first obfuscated version into their corresponding ASCII values to provide a second obfuscated version of the SQL statement. In the second obfuscated version, the concatenation of the characters is represented as follows: "char(88)+char(80)+char(95)+char(67)+char(77)+char(68)+char(83)+char(72)+char(69)+char(76)+char(76)". It will be recognized that the character "x" is represented as char(88); "p" is represented as char(80); "_" is represented as char(95), and so on. It will be further recognized that the multi-layer obfuscation of the SQL statement may compromise readability of the SQL statement, challenge detection of commands that have been removed through the obfuscation, and indicate that malicious behavior may have occurred.

In accordance with this implementation, a database server may parse the second obfuscated version of the SQL statement described above to obtain a processed version of the SQL statement, which is the same as the original SQL statement mentioned above. The version of the SQL statement that is received by the database server is referred to as the raw version of the SQL statement. Thus, in this example, the second obfuscated version of the SQL statement constitutes the raw version of the SQL statement. The comparison logic 312 may obtain the raw version of the SQL statement and the processed version of the SQL statement from the database server for analysis. The comparison logic 312 is capable of recognizing the xp_cmdshell command in the processed version of the SQL statement. However, due to the multi-layer obfuscation of the xp_cmdshell command in the raw version of the SQL statement, the raw version of the SQL statement includes "char(88)+char(80)+char(95)+char(67)+char(77)+char(68)+char(83)+char(72)+char(69)+char(76)+char(76)" in lieu of the xp_cmdshell command. Accordingly, the comparison logic 312 notifies the determination logic 314 that the processed version of the SQL statement includes the xp_cmdshell command, and the comparison logic 312 does not include the xp_cmdshell command among the commands that are indicated to be included in the raw version of the SQL statement. The determination logic 314 recognizes this disparity and notifies the detection logic 316 that the processed version of the SQL statement includes the xp_cmdshell command and that the raw version of the SQL statement does not include the xp_cmdshell command. Consequently, the detection logic 316 detects that the raw version of the SQL statement is malicious.

It may be desirable or necessary to determine whether the raw version of the SQL statement is malicious by considering an effect of the raw version of the SQL statement (i.e., an effect of an event that results from executing the raw version of the SQL statement) in addition to or in lieu of considering the processed version of the SQL statement. For instance, the processed version of the SQL statement may not be available for comparison to the raw version of the SQL statement. This scenario may arise when an entity that seeks to determine whether the raw version of the SQL statement is malicious does not have control over the database server, which generates the processed version of the SQL statement. In this example, although the raw version of the SQL statement does not include the xp_cmdshell command, execution of the raw version of the SQL statement results in a command shell running in an operating system. Based on this disparity, the detection logic may detect that the raw version of the SQL statement is malicious.

Figure 4:
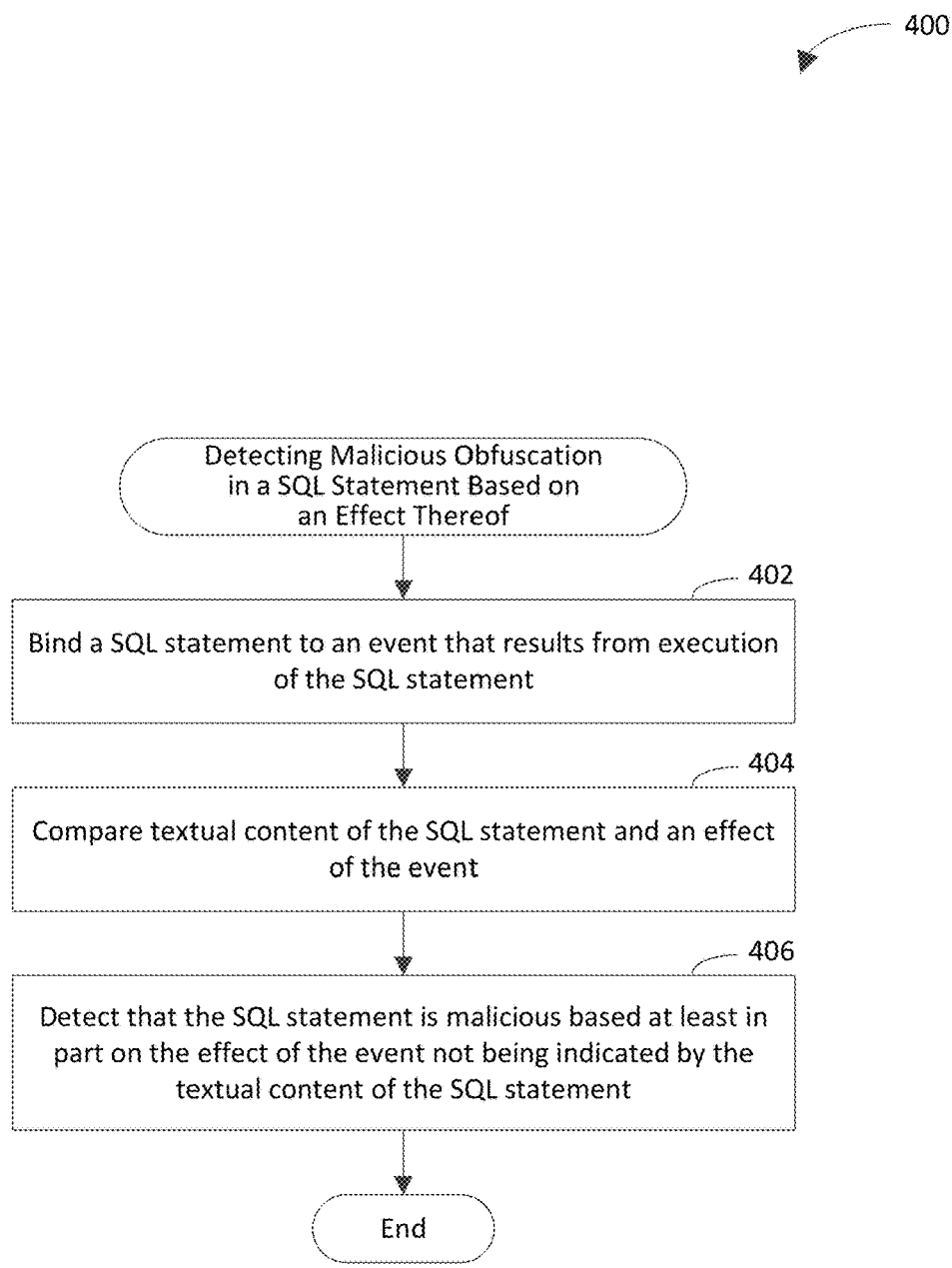
FIG. 4 depicts a flowchart of an example method for detecting malicious obfuscation in a SQL statement based on an effect thereof in accordance with an embodiment.
Figure 5:
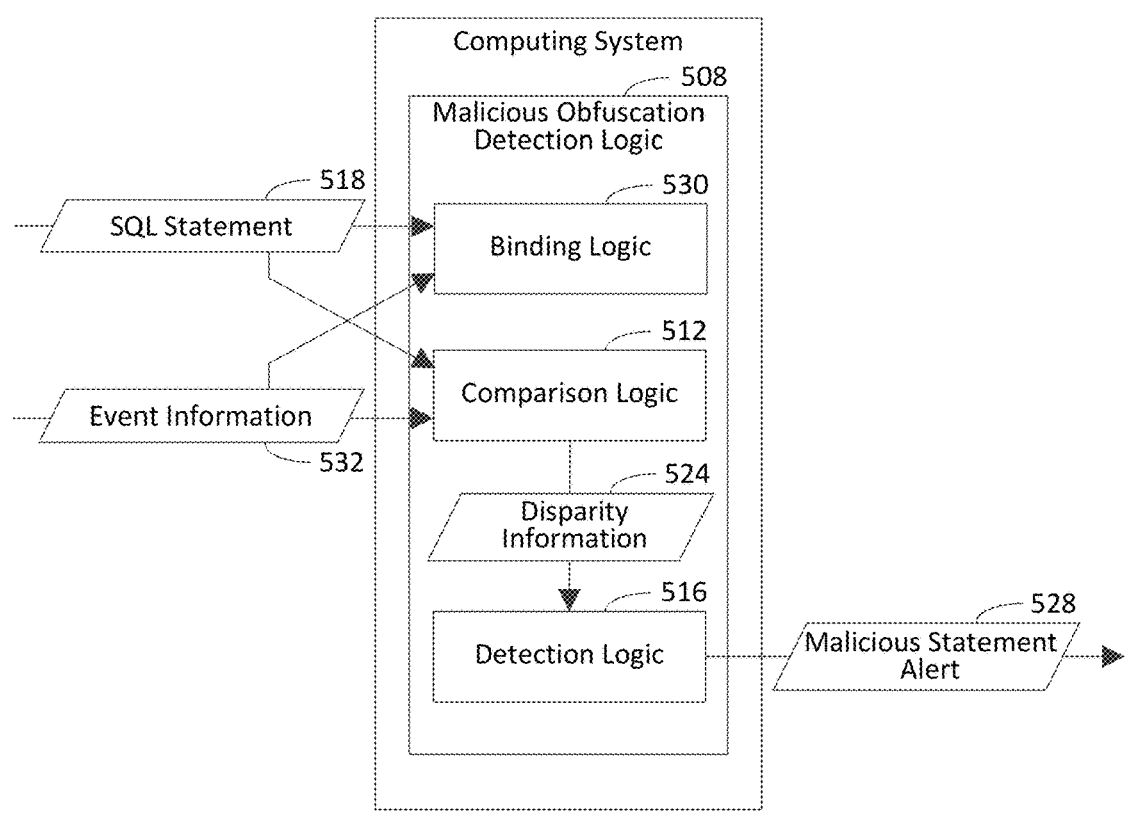
FIG. 5 is a block diagram of another example computing system in accordance with an embodiment.

FIG. 4 depicts a flowchart 400 of an example method for detecting malicious obfuscation in a SQL statement based on an effect thereof in accordance with an embodiment. Flowchart 400 may be performed by the first server(s) 106A shown in FIG. 1, for example. For illustrative purposes, flowchart 400 is described with respect to computing system 500 shown in FIG. 5, which is an example implementation of the first server(s) 106A. As shown in FIG. 5, the computing system 500 includes malicious obfuscation detection logic 508. The malicious obfuscation detection logic 508 includes binding logic 530, comparison logic 512, and detection logic 516. Further structural and operational embodiments will be apparent to persons skilled in the relevant art(s) based on the discussion regarding flowchart 400.

As shown in FIG. 4, the method of flowchart 400 begins at step 402. In step 402, a SQL statement is bound to an event that results from execution of the SQL statement. In an example implementation, the binding logic 530 binds a SQL statement 518 to an event that results from execution of the SQL statement 518. For example, event information 532 may cross reference SQL statements with events that result from the SQL statements. Accordingly, the event information 532 may cross-reference the SQL statement 518 to the event that results from execution of the SQL statement 518. In accordance with this example, the binding logic 530 may bind the SQL statement 518 to the event that results form the execution of the SQL statement 518 based on the event information 532 cross-referencing the SQL statement 518 to the event.

At step 404, textual content of the SQL statement and an effect of the event are compared. In an example implementation, the comparison logic 512 compares textual content of the SQL statement 518 and an effect of the event that results from the execution of the SQL statement 518. For example, the event information 532 may cross-reference events, which result from execution of SQL statements, with effects of those events. Accordingly, the event information 532 may cross-reference the event that results from the execution of the SQL statement 518 with the effect of the event. The comparison logic 512 may analyze the event information 532 to identify the effect of the event that results from the execution of the SQL statement 518. The comparison logic 512 may compare the textual content of the SQL statement 518 with the effect of the event, as identified by analyzing the event information 532. By comparing the textual content of the SQL statement 518 and the effect of the event, the comparison logic 512 may determine whether the effect of the event is indicated by the textual content. For example, whether the effect of the event is indicated by the textual content may be dictated by whether the textual content includes a command that is known to cause the effect of the event. In accordance with this example, if the textual content includes a command that is known to cause the effect, the textual content may be deemed to indicate the effect. In further accordance with this example, if the textual content does not include a command that is known to cause the effect, the textual content may be deemed to not indicate the effect. The comparison logic 512 may generate disparity information 524 to indicate a disparity between the textual content and the effect of the event. For instance, as a result of determining that the effect of the event is not indicated by the textual content, the comparison logic 512 may configure the disparity information 524 to indicate that the effect of the event is not indicated by the textual content.

In an example embodiment, the effect of the event that results from execution of the SQL statement includes connecting to a website hosted by a computer that is external to a computing system that performs step 404.

In another example embodiment, the effect of the event that results from execution of the SQL statement includes connecting to a device having an IP address that is different from an IP address of a computing system that performs step 404.

In yet another example embodiment, the effect of the event that results from execution of the SQL statement includes changing one or more configuration settings of a computer (e.g., a server or a user device). For instance, the computer may be a computing system that performs step 404. Examples of a configuration setting include but are not limited to a priority of a user and a security setting (e.g., close a firewall or alter an encryption technique). The configuration settings may be included in an operating system registry, though the example embodiments are not limited in this respect.

In still another example embodiment, the effect of the event that results from execution of the SQL statement includes communication with an operating system that executes on a computer (e.g., a server or a user device). For instance, the effect of the event may include invocation of a command shell (e.g., xp_cmdshell).

In yet another example embodiment, the effect of the event that results from execution of the SQL statement includes communication via a network.

At step 406, the SQL statement is detected to be malicious based at least in part on the effect of the event not being indicated by the textual content of the SQL statement. In an example implementation, the detection logic 516 detects that the SQL statement 518 is malicious based at least in part on the effect of the event not being indicated by the textual content of the SQL statement 518. For instance, the detection logic 516 may detect that the SQL statement 518 is malicious based at least in part on the disparity information 524 indicating that the effect of the event is not indicated by the textual content. In an aspect of this implementation, the detection logic 516 may generate a malicious statement alert 528 to provide notification that the SQL statement 518 is malicious. By knowing the effect of the event that results from execution of the SQL statement, the detection logic 516 is capable of including a description of the effect in the malicious statement alert 528.

In some example embodiments, one or more steps 402, 404, and/or 406 of flowchart 400 may not be performed. Moreover, steps in addition to or in lieu of steps 402, 404, and/or 406 may be performed. For instance, in an example embodiment, the method of flowchart 400 further includes determining the effect of the event by analyzing a system log that is generated by a computer on which the SQL statement is executed. For example, the comparison logic 512 may determine the effect of the event by analyzing a system log that is generated by a computer on which the SQL statement 518 is executed. In accordance with this example, the event information 532 may include the system log.

It will be recognized that the computing system 500 may not include one or more of the malicious obfuscation detection logic 508, the comparison logic 512, the detection logic 516, and/or the binding logic 530. Furthermore, the computing system 500 may include components in addition to or in lieu of the malicious obfuscation detection logic 508, the comparison logic 512, the detection logic 516, and/or the binding logic 530.

Figure 6:
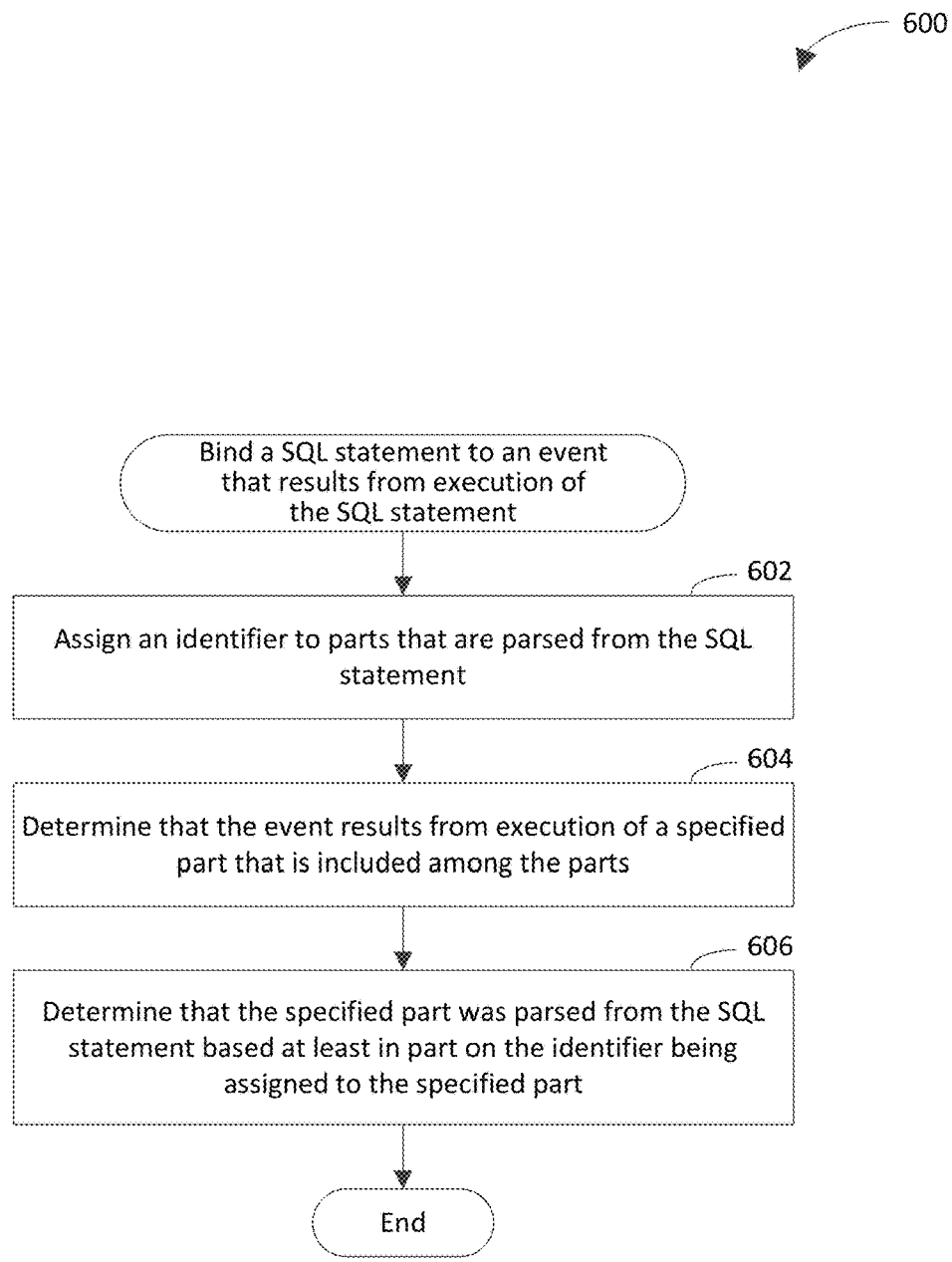
FIG. 6 depicts a flowchart of an example method for binding a SQL statement to an event that results from execution of the SQL statement in accordance with an embodiment.
Figure 7:
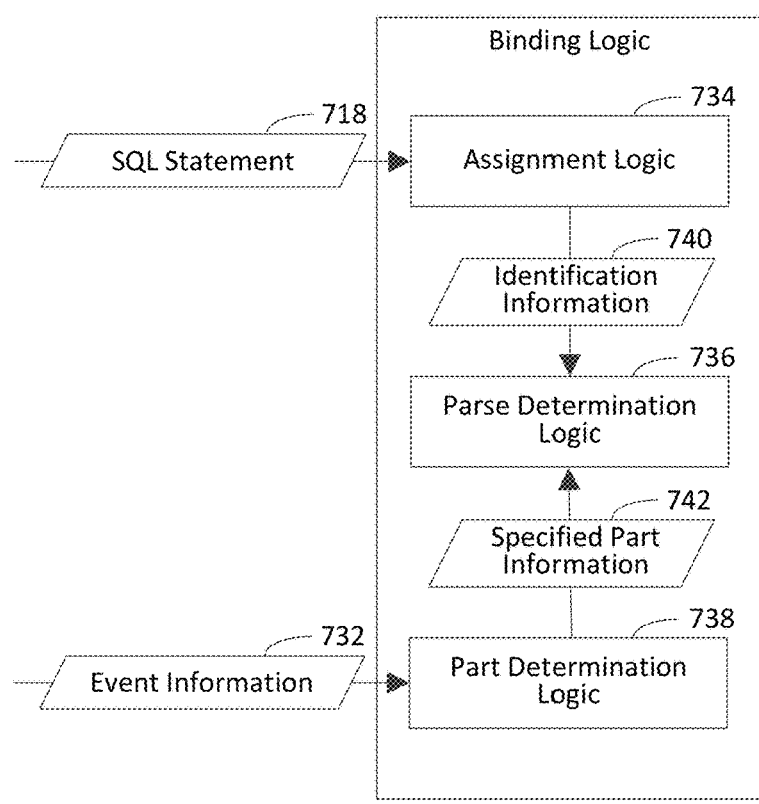
FIG. 7 is a block diagram of an example implementation of binding logic shown in FIG. 5 in accordance with an embodiment.

In another example embodiment, binding the SQL statement to the event that results from the execution of the SQL statement at step 402 includes one or more of the steps shown in flowchart 600 of FIG. 6. Flowchart 600 may be performed by the binding logic 530 shown in FIG. 5, for example. For illustrative purposes, flowchart 600 is described with respect to binding logic 700 shown in FIG. 7, which is an example implementation of the binding logic 530. As shown in FIG. 7, the binding logic 700 includes assignment logic 734, parse determination logic 736, and part determination logic 738. Further structural and operational embodiments will be apparent to persons skilled in the relevant art(s) based on the discussion regarding flowchart 600.

As shown in FIG. 6, the method of flowchart 600 begins at step 602. In step 602, an identifier is assigned to multiple parts that are parsed from the SQL statement. In an example implementation, the assignment logic 734 assigns the identifier to multiple parts that are parsed from the SQL statement 718. The assignment logic 734 may generate identification information 740 to identify the parts and to indicate that the identifier is assigned to the parts.

At step 604, a determination is made that the event results from execution of a specified part. The specified part is included in the parts that are parsed from the SQL statement. In an example implementation, the part determination logic 738 determines that the event results from the execution of the specified part, which is included among the parts that are parsed from the SQL statement 718. The part determination logic 738 may generate specified part information 742 to identify the specified part and to indicate that the event results from the execution of the specified part.

At step 606, a determination is made that the specified part was parsed from the SQL statement based at least in part on the identifier being assigned to the specified part. In an example implementation, parse determination logic 736 determines that the specified part was parsed form the SQL statement 718. The parse determination logic 736 makes the determination based at least in part on the identifier being assigned to the specified part. For instance, the parse determination logic 736 may analyze the specified part information to identify the specified part. The parse determination logic 736 may analyze the identification information 740 to determine that the specified part, as indicated by the specified part information 742, is included among the parts that are identified by the identification information 740. The parse determination logic 736 may determine that the identifier is assigned to the specified part based on the identification information 740 indicating that the identifier is assigned to the parts and further based on the determination that the specified part is included among the parts.

It will be recognized that the binding logic 700 may not include one or more of the assignment logic 734, the parse determination logic 736, and/or the part determination logic 738. Furthermore, the binding logic 700 may include components in addition to or in lieu of the assignment logic 734, the parse determination logic 736, and/or the part determination logic 738.

Figure 8:
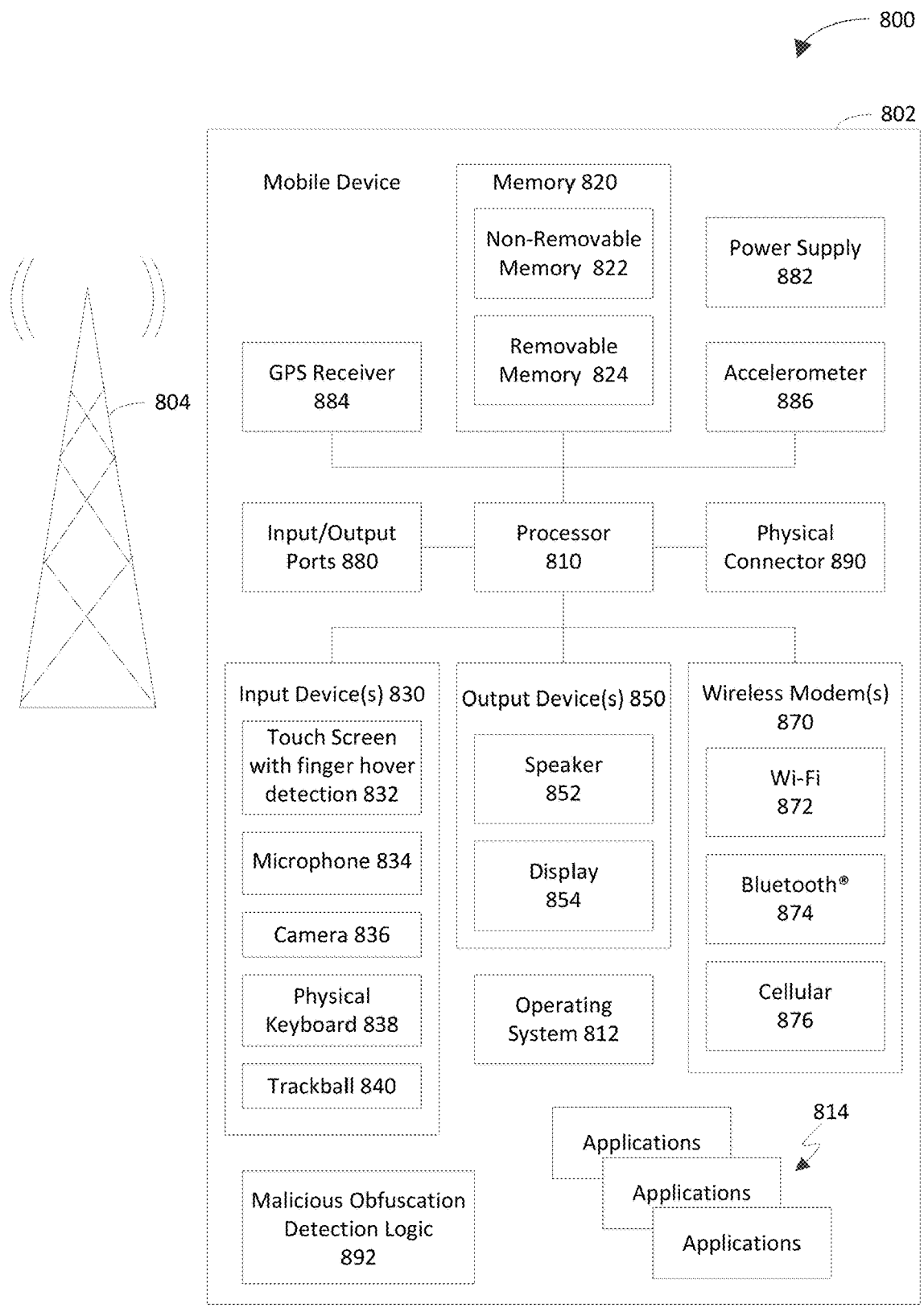
FIG. 8 is a system diagram of an exemplary mobile device in accordance with an embodiment.

FIG. 8 is a system diagram of an exemplary mobile device 800 including a variety of optional hardware and software components, shown generally as 802. Any components 802 in the mobile device may communicate with any other component, though not all connections are shown, for ease of illustration. The mobile device 800 may be any of a variety of computing devices (e.g., cell phone, smartphone, handheld computer, Personal Digital Assistant (PDA), etc.) and may allow wireless two-way communications with one or more mobile communications networks 804, such as a cellular or satellite network, or with a local area or wide area network.

The mobile device 800 may include a processor 810 (e.g., signal processor, microprocessor, ASIC, or other control and processing logic circuitry) for performing such tasks as signal coding, data processing, input/output processing, power control, and/or other functions. An operating system 812 may control the allocation and usage of the components 802 and support for one or more applications 814 (a.k.a. application programs). The applications 814 may include common mobile computing applications (e.g., email applications, calendars, contact managers, web browsers, messaging applications) and any other computing applications (e.g., word processing applications, mapping applications, media player applications).

The mobile device 800 may include memory 820. The memory 820 may include non-removable memory 822 and/or removable memory 824. The non-removable memory 822 may include RAM, ROM, flash memory, a hard disk, or other well-known memory storage technologies. The removable memory 824 may include flash memory or a Subscriber Identity Module (SIM) card, which is well known in GSM communication systems, or other well-known memory storage technologies, such as "smart cards." The memory 820 may store data and/or code for running the operating system 812 and the applications 814. Example data may include web pages, text, images, sound files, video data, or other data sets to be sent to and/or received from one or more network servers or other devices via one or more wired or wireless networks. Memory 820 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 800 may support one or more input devices 830, such as a touch screen 832, microphone 834, camera 836, physical keyboard 838 and/or trackball 840 and one or more output devices 850, such as a speaker 852 and a display 854. Touch screens, such as the touch screen 832, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 832 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

The mobile device 800 may include malicious obfuscation detection logic 892. The malicious obfuscation detection logic 892 is configured to detect malicious obfuscation in a SQL statement based on a processed version of the SQL statement and/or an effect of an event that results from executing the SQL statement in accordance with any one or more of the techniques described herein.

Other possible output devices (not shown) may include piezoelectric or other haptic output devices. Some devices may serve more than one input/output function. For example, touch screen 832 and display 854 may be combined in a single input/output device. The input devices 830 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 may include speech-recognition software as part of a voice control interface that allows a user to operate the mobile device 800 via voice commands. Furthermore, the mobile device 800 may include input devices and software that allows for user interaction via a user's spatial gestures, such as detecting and interpreting gestures to provide input to a gaming application.

Wireless modem(s) 870 may be coupled to antenna(s) (not shown) and may support two-way communications between the processor 810 and external devices, as is well understood in the art. The modem(s) 870 are shown generically and may include a cellular modem 876 for communicating with the mobile communication network 804 and/or other radio-based modems (e.g., Bluetooth® 874 and/or Wi-Fi 872). At least one of the wireless modem(s) 870 is typically configured for communication with one or more cellular networks, such as a GSM network for data and voice communications within a single cellular network, between cellular networks, or between the mobile device and a public switched telephone network (PSTN).

The mobile device may further include at least one input/output port 880, a power supply 882, a satellite navigation system receiver 884, such as a Global Positioning System (GPS) receiver, an accelerometer 886, and/or a physical connector 890, which may be a USB port, IEEE 1394 (FireWire) port, and/or RS-232 port. The illustrated components 802 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the malicious obfuscation detection logic 108, the malicious obfuscation detection logic 308, the comparison logic 312, the determination logic 314, the detection logic 316, the malicious obfuscation detection logic 508, the comparison logic 512, the detection logic 516, the binding logic 530, the binding logic 700, the assignment logic 734, the parse determination logic 736, the part determination logic 738, the malicious obfuscation detection logic 892, flowchart 200, flowchart 400, and/or flowchart 600 may be implemented in hardware, software, firmware, or any combination thereof.

For example, any one or more of the malicious obfuscation detection logic 108, the malicious obfuscation detection logic 308, the comparison logic 312, the determination logic 314, the detection logic 316, the malicious obfuscation detection logic 508, the comparison logic 512, the detection logic 516, the binding logic 530, the binding logic 700, the assignment logic 734, the parse determination logic 736, the part determination logic 738, the malicious obfuscation detection logic 892, flowchart 200, flowchart 400, and/or flowchart 600 may be implemented, at least in part, as computer program code configured to be executed in one or more processors.

In another example, any one or more of the malicious obfuscation detection logic 108, the malicious obfuscation detection logic 308, the comparison logic 312, the determination logic 314, the detection logic 316, the malicious obfuscation detection logic 508, the comparison logic 512, the detection logic 516, the binding logic 530, the binding logic 700, the assignment logic 734, the parse determination logic 736, the part determination logic 738, the malicious obfuscation detection logic 892, flowchart 200, flowchart 400, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
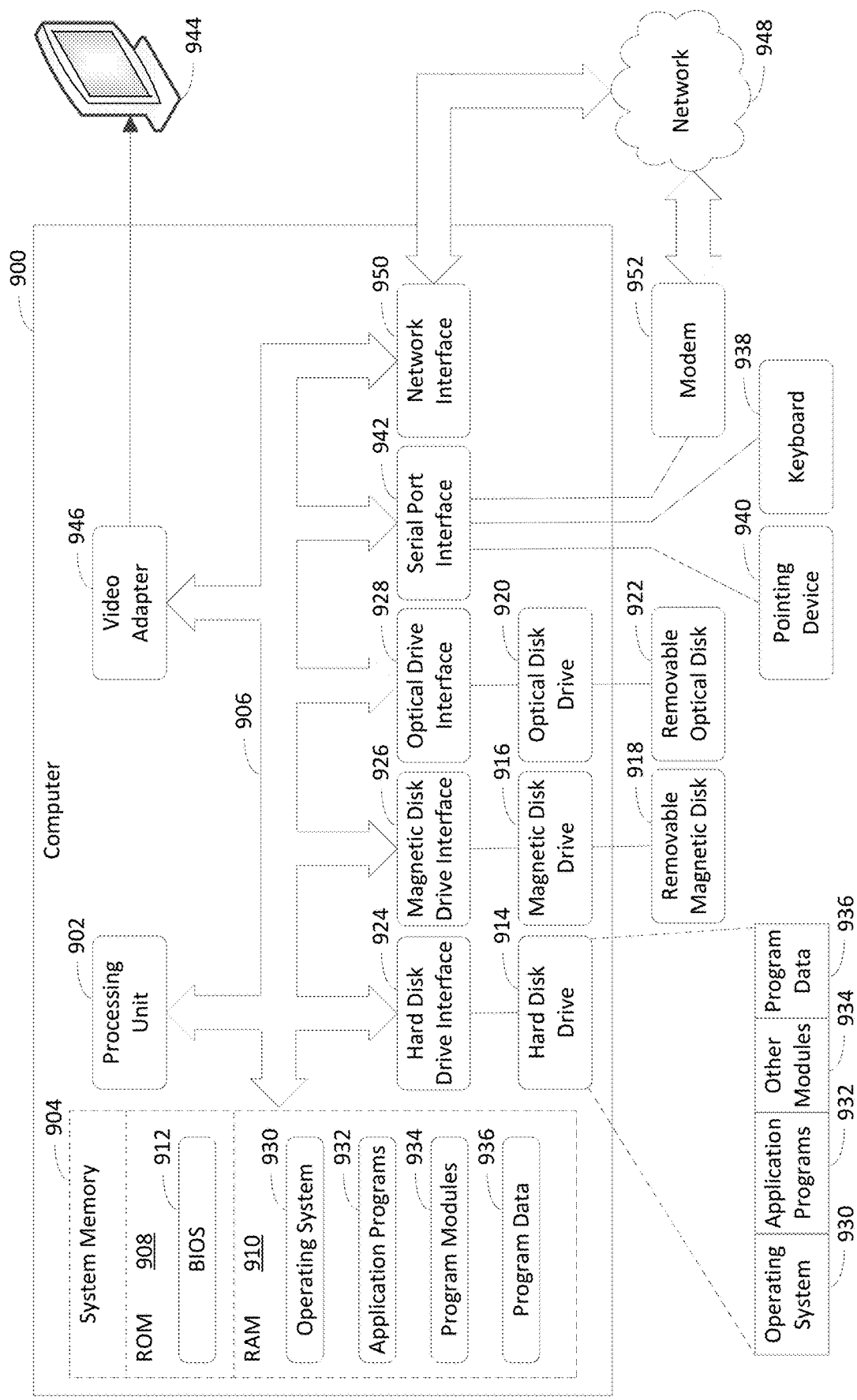
FIG. 9 depicts an example computer in which embodiments may be implemented.

III. Further Discussion of Some Example Embodiments (A1) A first example system (FIG. 1, 102A-102M or 106A-106N; FIG. 3, 300; FIG. 8, 802; FIG. 9, 900) comprises a memory (FIG. 8, 820; FIG. 9, 904, 908, 910) and one or more processors (FIG. 8, 810; FIG. 9, 902) coupled to the memory. The one or more processors are configured to compare (FIG. 2, 202) a raw version (FIG. 3, 318) of a SQL statement to a processed version (FIG. 3, 320) of the SQL statement that results from parsing of the raw version of the SQL statement. The raw version of the SQL statement and the processed version of the SQL statement are configured to produce a common result. The one or more processors are further configured to determine (FIG. 2, 204) that a command that is included in the processed version of the SQL statement is not included in the raw version of the SQL statement. The one or more processors are further configured to detect (FIG. 2, 206) that the raw version of the SQL statement is malicious based at least in part on the command that is included in the processed version of the SQL statement not being included in the raw version of the SQL statement.

(A2) In the example system of A1, wherein the raw version of the SQL statement formats a binary array that defines the SQL statement using a first format, and wherein the processed version of the SQL statement formats the binary array using a second format that is different from the first format.

(A3) In the example system of any of A1-A2, wherein the processing system is configured to: determine whether the command that is included in the processed version of the SQL statement is included in a pre-defined list of commands that are known to have been used for malicious activity; and detect that the raw version of the SQL statement is malicious further based at least in part on the command that is included in the processed version of the SQL statement being included in the pre-defined list of commands that are known to have been used for malicious activity.

(A4) In the example system of any of A1-A3, wherein the processing system is configured to: detect that the raw version of the SQL statement is malicious prior to execution of the SQL statement.

(A5) In the example system of any of A1-A4, wherein the processing system is configured to: determine that the command, which is configured to connect to a website hosted by a computer that is external to the computing system, is not included in the raw version of the SQL statement.

(A6) In the example system of any of A1-A5, wherein the processing system is configured to: determine that the command, which is configured to connect to a device having an IP address that is different from an IP address of the computing system, is not included in the raw version of the SQL statement.

(A7) In the example system of any of A1-A6, wherein the processing system is configured to: determine that the command, which is configured to change one or more configuration settings of a computer, is not included in the raw version of the SQL statement.

(A8) In the example system of any of A1-A7, wherein the processing system is configured to: determine that the command, which is configured to communicate with an operating system that executes on a computer, is not included in the raw version of the SQL statement.

(A9) In the example system of any of A1-A8, wherein the processing system is configured to: determine that the command, which is configured to communicate with a network, is not included in the raw version of the SQL statement.

(A10) In the example system of any of A1-A9, wherein the raw version of the SQL statement utilizes at least one of the following: string concatenation in which a plurality of parts of a string, which defines at least a portion of a command, are concatenated using one or more concatenation operators to form the string; or type casting in which a type of at least a portion of a command is changed from a first data type to a second data type that is different from the first data type.

(B1) A second example system (FIG. 1, 102A-102M or 106A-106N; FIG. 5, 500; FIG. 8, 802; FIG. 9, 900) comprises a memory (FIG. 8, 820; FIG. 9, 904, 908, 910) and one or more processors (FIG. 8, 810; FIG. 9, 902) coupled to the memory. The one or more processors are configured to bind (FIG. 4, 402) a SQL statement (FIG. 5, 518) to an event that results from execution of the SQL statement. The one or more processors are further configured to compare (FIG. 4, 404) textual content of the SQL statement and an effect of the event. The one or more processors are further configured to detect (FIG. 4, 406) that the SQL statement is malicious based at least in part on the effect of the event not being indicated by the textual content of the SQL statement.

(B2) In the example system of B1, wherein the processing system is configured to bind the SQL statement to the event by performing the following operations: assign an identifier to a plurality of parts that are parsed from the SQL statement; determine that the event results from execution of a specified part, wherein the specified part is included in the plurality of parts; and determine that the specified part was parsed from the SQL statement based at least in part on the identifier being assigned to the specified part.

(B3) In the example system of any of B1-B2, wherein the processing system is further configured to: determine the effect of the event by analyzing a system log that is generated by a computer on which the SQL statement is executed.

(B4) In the example system of any of B1-B3, wherein the effect of the event that results from execution of the SQL statement includes connecting to a website hosted by a computer that is external to the computing system.

(B5) In the example system of any of B1-B4, wherein the effect of the event that results from execution of the SQL statement includes connecting to a device having an IP address that is different from an IP address of the computing system.

(B6) In the example system of any of B1-B5, wherein the effect of the event that results from execution of the SQL statement includes changing one or more configuration settings of a computer.

(B7) In the example system of any of B1-B6, wherein the effect of the event that results from execution of the SQL statement includes communication with an operating system that executes on a computer.

(B8) In the example system of any of B1-B7, wherein the effect of the event that results from execution of the SQL statement includes communication via a network.

(C1) A first example method, which is implemented by a computing system (FIG. 1, 102A-102M or 106A-106N; FIG. 3, 300; FIG. 8, 802; FIG. 9, 900), comprises comparing (FIG. 2, 202) a raw version (FIG. 3, 318) of a SQL statement to a processed version (FIG. 3, 320) of the SQL statement that results from parsing of the raw version of the SQL statement. The raw version of the SQL statement and the processed version of the SQL statement are configured to produce a common result. The method further comprises determining (FIG. 2, 204) that a command that is included in the processed version of the SQL statement is not included in the raw version of the SQL statement. The method further comprises detecting (FIG. 2, 206) that the raw version of the SQL statement is malicious based at least in part on the command that is included in the processed version of the SQL statement not being included in the raw version of the SQL statement.

(C2) In the method of C1, wherein the raw version of the SQL statement formats a binary array that defines the SQL statement using a first format, and wherein the processed version of the SQL statement formats the binary array using a second format that is different from the first format.

(C3) In the method of any of C1-C2, further comprising: determining whether the command that is included in the processed version of the SQL statement is included in a pre-defined list of commands that are known to have been used for malicious activity; wherein detecting that the raw version of the SQL statement is malicious comprises: detecting that the raw version of the SQL statement is malicious further based at least in part on the command that is included in the processed version of the SQL statement being included in the pre-defined list of commands that are known to have been used for malicious activity.

(C4) In the method of any of C1-C3, wherein detecting that the raw version of the SQL statement is malicious comprises: detecting that the raw version of the SQL statement is malicious prior to execution of the SQL statement.

(C5) In the method of any of C1-C4, wherein determining that the command is not included in the raw version of the SQL statement comprises: determining that the command, which is configured to connect to a website hosted by a computer that is external to the computing system, is not included in the raw version of the SQL statement.

(C6) In the method of any of C1-C5, wherein determining that the command is not included in the raw version of the SQL statement comprises: determining that the command, which is configured to connect to a device having an IP address that is different from an IP address of the computing system, is not included in the raw version of the SQL statement.

(C7) In the method of any of C1-C6, wherein determining that the command is not included in the raw version of the SQL statement comprises: determining that the command, which is configured to change one or more configuration settings of a computer, is not included in the raw version of the SQL statement.

(C8) In the method of any of C1-C7, wherein determining that the command is not included in the raw version of the SQL statement comprises: determining that the command, which is configured to communicate with an operating system that executes on a computer, is not included in the raw version of the SQL statement.

(C9) In the method of any of C1-C8, wherein determining that the command is not included in the raw version of the SQL statement comprises: determining that the command, which is configured to communicate with a network, is not included in the raw version of the SQL statement.

(C10) In the method of any of C1-C9, wherein the raw version of the SQL statement utilizes at least one of the following: string concatenation in which a plurality of parts of a string, which defines at least a portion of a command, are concatenated using one or more concatenation operators to form the string; or type casting in which a type of at least a portion of a command is changed from a first data type to a second data type that is different from the first data type.

(D1) A second example method, which is implemented by a computing system (FIG. 1, 102A-102M or 106A-106N; FIG. 5, 500; FIG. 8, 802; FIG. 9, 900), comprises binding (FIG. 4, 402) a SQL statement (FIG. 5, 518) to an event that results from execution of the SQL statement. The method further comprises comparing (FIG. 4, 404) textual content of the SQL statement and an effect of the event. The method further comprises detecting (FIG. 4, 406) that the SQL statement is malicious based at least in part on the effect of the event not being indicated by the textual content of the SQL statement.

(D2) In the method of D1, wherein binding the SQL statement to the event comprises: assigning an identifier to a plurality of parts that are parsed from the SQL statement; determining that the event results from execution of a specified part, wherein the specified part is included in the plurality of parts; and determining that the specified part was parsed from the SQL statement based at least in part on the identifier being assigned to the specified part.

(D3) In the method of any of D1-D2, further comprising: determining the effect of the event by analyzing a system log that is generated by a computer on which the SQL statement is executed.

(D4) In the method of any of D1-D3, wherein the effect of the event that results from execution of the SQL statement includes connecting to a website hosted by a computer that is external to the computing system.

(D5) In the method of any of D1-D4, wherein the effect of the event that results from execution of the SQL statement includes connecting to a device having an IP address that is different from an IP address of the computing system.

(D6) In the method of any of D1-D5, wherein the effect of the event that results from execution of the SQL statement includes changing one or more configuration settings of a computer.

(D7) In the method of any of D1-D6, wherein the effect of the event that results from execution of the SQL statement includes communication with an operating system that executes on a computer.

(D8) In the method of any of D1-D7, wherein the effect of the event that results from execution of the SQL statement includes communication via a network.

(E1) A first example computer program product (FIG. 8, 824; FIG. 9, 918, 922) comprising a computer-readable storage medium having instructions recorded thereon for enabling a processor-based system (FIG. 1, 102A-102M or 106A-106N; FIG. 3, 300; FIG. 8, 802; FIG. 9, 900) to perform operations. The operations comprise comparing (FIG. 2, 202) a raw version (FIG. 3, 318) of a SQL statement to a processed version (FIG. 3, 320) of the SQL statement that results from parsing of the raw version of the SQL statement. The raw version of the SQL statement and the processed version of the SQL statement are configured to produce a common result. The operations further comprise determining (FIG. 2, 204) that a command that is included in the processed version of the SQL statement is not included in the raw version of the SQL statement. The operations further comprise detecting (FIG. 2, 206) that the raw version of the SQL statement is malicious based at least in part on the command that is included in the processed version of the SQL statement not being included in the raw version of the SQL statement.

(E2) In the example computer program product of E1, wherein the operations comprise: determining whether the command that is included in the processed version of the SQL statement is included in a pre-defined list of commands that are known to have been used for malicious activity; and detecting that the raw version of the SQL statement is malicious further based at least in part on the command that is included in the processed version of the SQL statement being included in the pre-defined list of commands that are known to have been used for malicious activity.

(F1) A second example computer program product (FIG. 8, 824; FIG. 9, 918, 922) comprising a computer-readable storage medium having instructions recorded thereon for enabling a processor-based system (FIG. 1, 102A-102M or 106A-106N; FIG. 5, 500; FIG. 8, 802; FIG. 9, 900) to perform operations. The operations comprise binding (FIG. 4, 402) a SQL statement (FIG. 5, 518) to an event that results from execution of the SQL statement. The operations further comprise comparing (FIG. 4, 404) textual content of the SQL statement and an effect of the event. The operations further comprise detecting (FIG. 4, 406) that the SQL statement is malicious based at least in part on the effect of the event not being indicated by the textual content of the SQL statement.

(F2) In the example computer program product of F1, wherein the operations comprise binding the SQL statement to the event by performing the following actions: assigning an identifier to a plurality of parts that are parsed from the SQL statement; determining that the event results from execution of a specified part, wherein the specified part is included in the plurality of parts; and determining that the specified part was parsed from the SQL statement based at least in part on the identifier being assigned to the specified part.

IV. Example Computer System

FIG. 9 depicts an example computer 900 in which embodiments may be implemented. Any one or more of the user devices 102A-102M and/or any one or more of the servers 106A-106N shown in FIG. 1; computing system 300 shown in FIG. 3; and/or computing system 500 shown in FIG. 5 may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting.

Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of (e.g., at least a portion of) the malicious obfuscation detection logic 108, the malicious obfuscation detection logic 308, the comparison logic 312, the determination logic 314, the detection logic 316, the malicious obfuscation detection logic 508, the comparison logic 512, the detection logic 516, the binding logic 530, the binding logic 700, the assignment logic 734, the parse determination logic 736, the part determination logic 738, the malicious obfuscation detection logic 892, flowchart 200 (including any step of flowchart 200), flowchart 400 (including any step of flowchart 400), and/or flowchart 600 (including any step of flowchart 600), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computing system comprising:
a memory that stores an operating system; and
a processing system coupled to the memory, the processing system configured to execute the operating system, the operating system configured to, when executed, perform the following:
compare a raw version of a structured query language (SQL) statement to a processed version of the SQL statement that results from parsing of the raw version of the SQL statement, wherein the raw version of the SQL statement and the processed version of the SQL statement are configured to produce a common result;
determine that a command that is comprised in the processed version of the SQL statement is obfuscated in the raw version of the SQL statement;
detect that the raw version of the SQL statement is malicious based at least on the command that is comprised in the processed version of the SQL statement being obfuscated in the raw version of the SQL statement; and
as a result of detecting that the raw version of the SQL statement is malicious, prevent execution of the SQL statement.

2. The computing system of claim 1, wherein the raw version of the SQL statement formats a binary array that defines the SQL statement using a first format, and
wherein the processed version of the SQL statement formats the binary array using a second format that is different from the first format.

3. The computing system of claim 1, wherein the operating system is configured to, when executed, perform the following:
determine whether the command that is comprised in the processed version of the SQL statement is comprised in a pre-defined list of commands that are known to have been used for malicious activity; and
detect that the raw version of the SQL statement is malicious further based at least on the command that is comprised in the processed version of the SQL statement being comprised in the pre-defined list of commands that are known to have been used for malicious activity.

4. The computing system of claim 1, wherein the operating system is configured to, when executed, perform the following:
determine that the command, which is configured to connect to a website hosted by a computer that is external to the computing system, is obfuscated in the raw version of the SQL statement.

5. The computing system of claim 1, wherein the operating system is configured to, when executed, perform the following:
determine that the command, which is configured to connect to a device having an IP address that is different from an IP address of the computing system, is obfuscated in the raw version of the SQL statement.

6. The computing system of claim 1, wherein the operating system is configured to, when executed, perform the following:
determine that the command, which is configured to change a configuration setting of a computer, is obfuscated in the raw version of the SQL statement.

7. The computing system of claim 1, wherein the operating system is configured to, when executed, perform the following:
determine that the command, which is configured to communicate with an operating system that executes on a computer, is obfuscated in the raw version of the SQL statement.

8. The computing system of claim 1, wherein the operating system is configured to, when executed, perform the following:
determine that the command, which is configured to communicate with a network, is obfuscated in the raw version of the SQL statement.

9. The computing system of claim 1, wherein the raw version of the SQL statement utilizes string concatenation in which a plurality of parts of a string, which defines at least a portion of a command, are concatenated using a concatenation operator to form the string.

10. The computing system of claim 1, wherein the raw version of the SQL statement utilizes type casting in which a type of at least a portion of a command is changed from a first data type to a second data type that is different from the first data type.

11. A method, which is implemented by a computing system, comprising:
comparing a raw version of a structured query language (SQL) statement to a processed version of the SQL statement that results from parsing of the raw version of the SQL statement, wherein the raw version of the SQL statement and the processed version of the SQL statement are configured to produce a common result;
determining that a command that is comprised in the processed version of the SQL statement is obfuscated in the raw version of the SQL statement;
detecting that the raw version of the SQL statement is malicious based at least on the command that is comprised in the processed version of the SQL statement being obfuscated in the raw version of the SQL statement; and
as a result of detecting that the raw version of the SQL statement is malicious, execute an instruction, which prevents execution of the SQL statement.

12. The method of claim 11, wherein a series of bits that defines the SQL statement is common among the raw version of the SQL statement and the processed version of the SQL statement; and
wherein the method further comprises:
defining the raw version of the SQL statement by interpreting the series of bits in a first manner; and
defining the processed version of the SQL statement by interpreting the series of bits in a second manner, which is different from the first manner.

13. The method of claim 12, further comprising:
removing obfuscation of the command, which is obfuscated in the raw version of the SQL statement, to generate the processed version of the SQL statement, which causes the command to be comprised in the processed version of the SQL statement.

14. The method of claim 11, wherein the raw version of the SQL statement formats a binary array that defines the SQL statement using a first format, and
wherein the processed version of the SQL statement formats the binary array using a second format that is different from the first format.

15. The method of claim 14, wherein the SQL statement is written in accordance with the first format, and the SQL statement is read in accordance with the second format.

16. The method of claim 11, further comprising:
determining whether the command that is comprised in the processed version of the SQL statement is comprised in a pre-defined list of commands that are known to have been used for malicious activity;
wherein detecting that the raw version of the SQL statement is malicious comprises:
detecting that the raw version of the SQL statement is malicious further based at least on the command that is comprised in the processed version of the SQL statement being comprised in the pre-defined list of commands that are known to have been used for malicious activity.

17. The method of claim 11, wherein the command is configured to perform at least one of the following operations:
connect to a website hosted by a first computer that is external to the computing system;
connect to a device having an IP address that is different from an IP address of the computing system;
change a configuration setting of a second computer;
communicate with an operating system that executes on the second computer; or
communicate with a network.

18. The method of claim 11, wherein the raw version of the SQL statement utilizes:
string concatenation in which a plurality of parts of a string, which defines at least a portion of a command, are concatenated using a concatenation operator to form the string; and
type casting in which a type of at least the portion of the command is changed from a first data type to a second data type that is different from the first data type.

19. The method of claim 11, wherein detecting that the raw version of the SQL statement is malicious comprises:
detecting that the raw version of the SQL statement is malicious in absence of re-parsing the raw version of the SQL statement.

20. A computer program product comprising a computer-readable storage medium having instructions recorded thereon for enabling a processor-based system to perform operations, the operations comprising:
comparing a raw version of a structured query language (SQL) statement to a processed version of the SQL statement that results from parsing of the raw version of the SQL statement, wherein the raw version of the SQL statement and the processed version of the SQL statement are configured to produce a common result;
determining that a command that is comprised in the processed version of the SQL statement is obfuscated in the raw version of the SQL statement;
detecting that the raw version of the SQL statement is malicious based at least on the command that is comprised in the processed version of the SQL statement being obfuscated in the raw version of the SQL statement; and
as a result of detecting that the raw version of the SQL statement is malicious, performing a remedial operation, which comprises preventing execution of the SQL statement.

* * * * *